(12) United States Patent
Tokimasa et al.

(10) Patent No.: US 9,783,196 B2
(45) Date of Patent: Oct. 10, 2017

(54) VEHICLE CONTROL APPARATUS FOR IMPLEMENTING INTER-VEHICLE DISTANCE CONTROL USING OFFSET ASSOCIATED WITH TARGET ON PRECEDING VEHICLE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuhiro Tokimasa, Okazaki (JP); Youhei Masui, Nagoya (JP); Minoru Nakadori, Toyota (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 52 days.

(21) Appl. No.: 14/796,961

(22) Filed: Jul. 10, 2015

(65) Prior Publication Data

US 2016/0009284 A1    Jan. 14, 2016

(30) Foreign Application Priority Data

Jul. 11, 2014 (JP) ................................. 2014-143708

(51) Int. Cl.
| | |
|---|---|
| *B60W 30/16* | (2012.01) |
| *G08G 1/16* | (2006.01) |
| *B60W 30/165* | (2012.01) |
| *B60W 40/04* | (2006.01) |
| *G01S 13/08* | (2006.01) |
| *G01S 13/86* | (2006.01) |
| *G01S 13/58* | (2006.01) |
| *G01S 13/93* | (2006.01) |

(52) U.S. Cl.
CPC .......... *B60W 30/16* (2013.01); *B60W 30/165* (2013.01); *B60W 40/04* (2013.01);
(Continued)

(58) Field of Classification Search
None
See application file for complete search history.

(56) References Cited

U.S. PATENT DOCUMENTS 7,158,218 B2 *   1/2007  Arita ..................... G01S 17/936
                                                            342/70
8,788,176 B1 *   7/2014  Yopp ................... B60W 30/095
                                                            701/300

(Continued)

FOREIGN PATENT DOCUMENTS

WO    WO2014/038076 A1    3/2014

*Primary Examiner* — Rami Khatib
*Assistant Examiner* — Jeffrey Boomer
(74) *Attorney, Agent, or Firm* — Knobbe, Martens, Olson & Bear, LLP (57) ABSTRACT

A vehicle control apparatus for implementing inter-vehicle distance control of a vehicle carrying the apparatus behind a preceding vehicle. In the apparatus, an offset storage is configured to calculate an offset that is a difference between detected distances to first and second targets, and store the offset associated with the first target forward of the second target. The inter-vehicle distance control may be implemented based on a distance calculated by subtracting the offset from the detected distance to the first target. An offset updater is configured to determine whether or not a relative distance between the first and second targets has increased or decreased, and when the relative distance between the first and second targets has increased or decreased, update the offset stored by the offset storage.

17 Claims, 5 Drawing Sheets

(52) U.S. Cl.
CPC .............. *G01S 13/08* (2013.01); *G01S 13/58* (2013.01); *G01S 13/867* (2013.01); *G01S 13/931* (2013.01); *G08G 1/165* (2013.01); *G08G 1/166* (2013.01); *B60W 2550/302* (2013.01); *B60W 2550/308* (2013.01); *B60W 2750/308* (2013.01); *G01S 2013/9325* (2013.01); *G01S 2013/9375* (2013.01); *G01S 2013/9389* (2013.01)

(56) References Cited

U.S. PATENT DOCUMENTS

| | | | |
|---|---|---|---|
| 2005/0159875 A1* | 7/2005 | Chia | B60K 31/0008 701/93 |
| 2006/0274299 A1* | 12/2006 | Matsuura | G01S 17/936 356/4.01 |
| 2007/0233353 A1* | 10/2007 | Kade | B60T 7/22 701/96 |
| 2009/0254260 A1* | 10/2009 | Nix | B60W 30/16 701/96 |
| 2010/0085238 A1* | 4/2010 | Muller-Frahm | G01S 11/12 342/70 |
| 2010/0256852 A1* | 10/2010 | Mudalige | G08G 1/163 701/24 |
| 2015/0120138 A1* | 4/2015 | Zeng | B62D 15/0265 701/41 |
| 2015/0175162 A1* | 6/2015 | Nakadori | G01S 7/41 701/96 |
| 2016/0009280 A1* | 1/2016 | Tokimasa | B60W 30/16 701/96 |
| 2016/0009281 A1* | 1/2016 | Tokimasa | B60W 30/16 701/96 |
| 2016/0009282 A1* | 1/2016 | Tokimasa | B60W 30/16 701/96 |
| 2016/0009283 A1* | 1/2016 | Tokimasa | B60W 30/16 701/96 |

* cited by examiner

VEHICLE CONTROL APPARATUS FOR IMPLEMENTING INTER-VEHICLE DISTANCE CONTROL USING OFFSET ASSOCIATED WITH TARGET ON PRECEDING VEHICLE

CROSS-REFERENCE TO RELATED APPLICATION

This application is based on and claims the benefit of priority from earlier Japanese Patent Applications No. 2014-143708 filed Jul. 11, 2014, the descriptions of which are incorporated herein by reference.

BACKGROUND

Technical Field

The present disclosure relates to a vehicle control apparatus for controlling an inter-vehicle distance between a vehicle carrying the apparatus and a preceding vehicle.

Related Art

A known vehicle control apparatus, as disclosed in the international publication WO2014/038076, is configured to control travel of a vehicle carrying the apparatus (hereinafter referred to as a subject vehicle) to bring an inter-vehicle distance between the subject vehicle and a preceding vehicle to a target inter-vehicle distance. Such a vehicle control apparatus may use a radar device to transmit radar waves to the front of the subject vehicle and receive reflected waves from a target to generate target information about the target. The target information includes a separation distance between the subject vehicle and the target, a relative speed and a lateral position of the target relative to the subject vehicle, and others.

Further, based on the target information, two or more targets, among a plurality of targets, that exhibit the same behaviour are determined as belonging to the same preceding vehicle, and the inter-vehicle distance control is implemented to follow the target that is closest to the subject vehicle among the two or more targets on the same preceding vehicle (hereinafter referred to as a rear-end target). A separation distance between the rear-end target and another one of the two or more targets that is forward of the rear-end target (hereinafter referred to as a forward target) is stored as an offset. This allows a position of the rear-end target to be estimated using the offset and a detected distance from the subject vehicle to the forward target even when the rear-end target is no longer detected, for example, upon the subject vehicle approaching the preceding vehicle. Thus, the inter-vehicle distance control to follow the rear-end target of the preceding vehicle can be continued.

However, in the presence of two targets on the preceding vehicle, one forward of the other, the two targets may not remain unchanged in fore-and-aft position, but either or both of the two targets may be forward or rearward displaced unexpectedly due to various factors. Then, there is concern that the inter-vehicle distance control cannot be implemented correctly without taking into account such displacement.

In consideration of the foregoing, exemplary embodiments of the present disclosure are directed to providing a vehicle control apparatus capable of properly implementing inter-vehicle distance control of a vehicle carrying the apparatus behind a preceding vehicle.

SUMMARY

In accordance with an exemplary embodiment of the present invention, there is provided a vehicle control apparatus for implementing inter-vehicle distance control of a vehicle carrying the apparatus behind a preceding vehicle based on reflected waves from at least one target that is a reflecting portion of the preceding vehicle, the vehicle carrying the apparatus being referred to as a subject vehicle, the reflected waves being radar waves transmitted to a front of the subject vehicle and then reflected from the at least one target. The apparatus includes: a target information acquirer configured to acquire target information about each of the at least one target from the reflected waves, the target information including a detected distance from the subject vehicle to the target of the preceding vehicle; an offset storage configured to, in the presence of first and second targets forward of the subject vehicle, the first target being forward of the second target, the second target being a target recognized as a rear end of the preceding vehicle, calculate and store an offset associated with the first target, the offset being a difference between the detected distance to the first target and the detected distance to the second target; and a controller configured to implement the inter-vehicle distance control to follow the second target based on the detected distance to the second target, and when the second target fails to be detected, implement the inter-vehicle distance control based on a distance calculated by subtracting the offset associated with the first target stored by the offset storage from the detected distance to the first target. The apparatus further includes an offset updater configured to determine whether or not a relative distance between the first and second targets has increased or decreased, when it is determined that the relative distance between the first and second targets has increased or decreased, update the offset stored in the offset storage using at least one of the detected distance to the first target and the detected distance to the second target acquired after the relative distance between the first and second targets has increased or decreased.

In the embodiment, it is determined whether or not the relative distance between the first and second targets has increased or decreased, and if it is determined that the relative distance between the first and second targets has increased or decreased, then the offset is updated. With this configuration, even if one or more targets on the preceding vehicle are displaced unexpectedly, the proper inter-vehicle distance control can be continually implemented while handling such target displacement.

DESCRIPTION OF SPECIFIC EMBODIMENTS

Embodiments of the present disclosure will now be described with reference to the accompanying drawings. A vehicle control apparatus in accordance with one embodiment of the present disclosure is configured to implement adaptive cruise control, that is, control a distance from a vehicle carrying the apparatus (hereinafter referred to as a subject vehicle) to a preceding vehicle detected by the radar or the like to a target distance (referred to as a target inter-vehicle distance) as a function of a speed of the preceding vehicle during following travel. When the preceding vehicle is stopped, the subject vehicle stops at a proper distance from the preceding vehicle. When travel of the preceding vehicle is restarted, the subject vehicle restarts the following travel while maintaining the distance to the preceding vehicle in accordance with the speed of the preceding vehicle. When the preceding vehicle ceases to be detected, the subject vehicle suspends the following travel and transitions to steady state cruising at a vehicle speed set by a driver of the subject vehicle.

The vehicle control apparatus of the present embodiment is equipped with a full speed range adaptive cruise control (ACC) function. The full speed range refers to a range from zero or a very low speed to a predefined high speed (e.g., a legal speed or an upper limit speed set by the driver or the like). Enabling the adaptive cruise control in the full speed range (particularly in a low speed range) can reduce a driving load caused by frequent start/stop operations during a traffic jam. Although the inter-vehicle distance control, the following travel and the adaptive cruise control do not have the same meaning, they are used interchangeably in the present embodiment.

Figure 1:
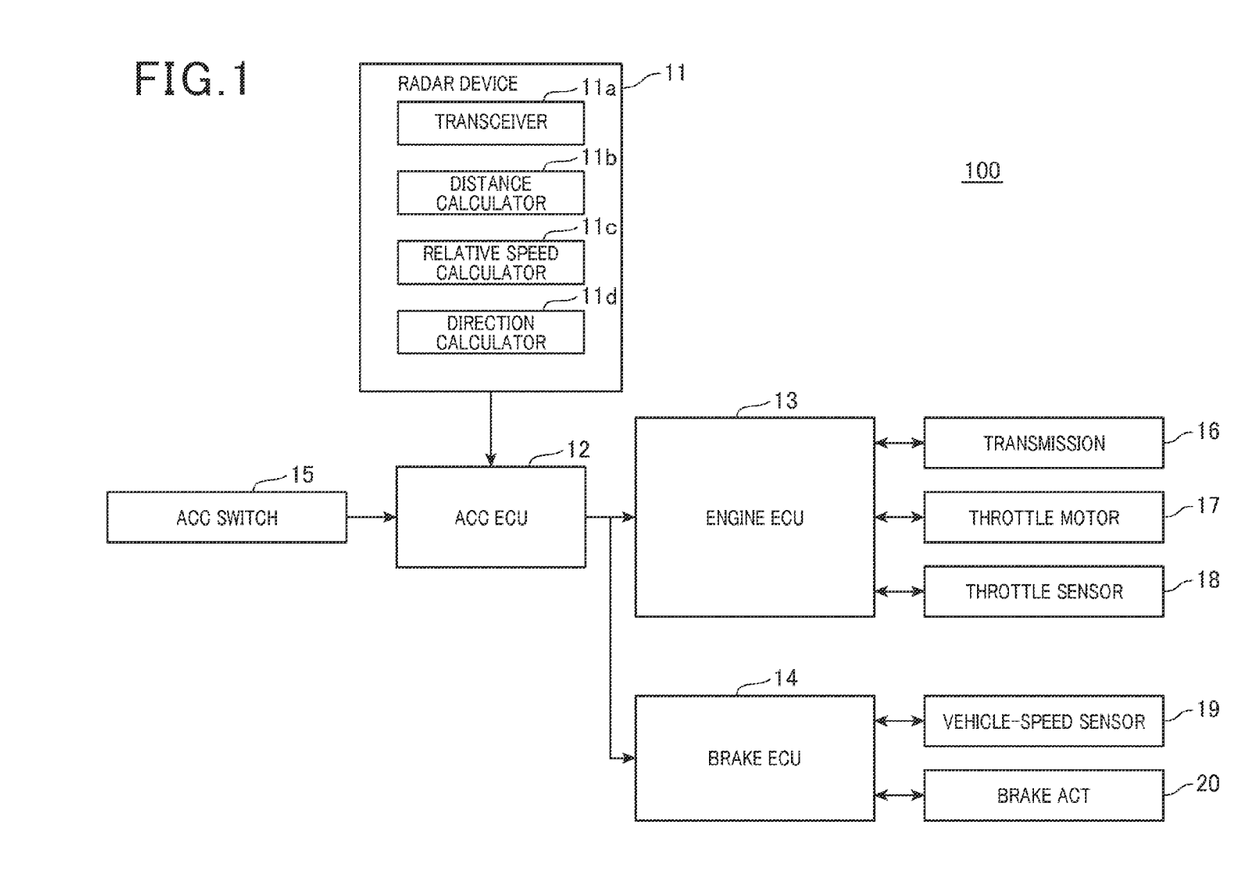
FIG. 1 is a block diagram of a vehicle control system in accordance with one embodiment of the present disclosure.

Referring to FIG. 1, an adaptive cruise control (ACC) apparatus 100 includes a radar device 11, an adaptive cruise control (ACC) electronic control unit (ECU) 12 (as the vehicle control apparatus), an engine ECU 13, and a brake ECU 14. The ACC ECU 12 is configured to implement the adaptive cruise control in conjunction with the radar device 11 and other ECUs.

The radar device 11 and the ECUs 12-14 are connected communicatively to each other via an onboard network, such as a controller area network (CAN). An adaptive cruise control (ACC) switch 15 is connected to the ACC ECU 12 via an exclusive line, such as a serial communication line. A transmission 16, a throttle motor 17, and a throttle sensor 18 are connected to the engine ECU 13 via exclusive lines. A vehicle-speed sensor 19 and a brake actuator (brake ACT) 20 are connected to the brake ECU via exclusive lines.

Each of the radar device 11 and the ECUs 12-14 is an information processor including a microcomputer, a power supply, a wiring harness interface and others. The microcomputer is of a well-known configuration including CPU, ROM, RAM, an input/output interface (I/O), and a CAN communication device. The CPU loads programs stored in the ROM into the RAM and executes the programs to receive signals from the sensors via the input/output interface and control the actuator and the like. The CAN communication device transmits data to and receives data from the other ECUs 12-14 and others via the CAN. It will be appreciated that partitioning of functions described later between these ECUs 12-14 is exemplary and other partitioning of functions between these ECUs 12-14 is also possible.

The radar device 11, which is an example of means for detecting a distance from the subject vehicle to the preceding vehicle, is configured to detect, for each target, a distance to the target and a relative speed and a lateral position of the target, and provide the detection result to the ACC ECU 12.

The radar device 11 is configured to transmit a radio-frequency signal in a millimeter waveband as transmit waves. In the present embodiment, any one of a frequency-modulated continuous-wave (FMCW) approach and a pulsed-radar approach and other well-known approaches may be used in the radar device 11 according to the type of transmission. The pulsed radar is configured to transmit the radar waves while changing the transmission direction of the transmit waves in a predetermined transmission range and determine a direction of a target from the transmission direction when reflected waves from the target are received. The FMCW approach will now be briefly explained.

The radar device 11 includes a transceiver 11a for transmitting and receiving radar waves. The transceiver 11a is configured to transmit the radar waves within a predetermined forward transmission range of the radar while linearly increasing the frequency with time at a predetermined increase rate and then linearly decreasing the frequency with time at a predetermined decrease rate. The radar waves reflected from a target forward of the subject vehicle are received by a plurality of antennas. The received waves are mixed with the transmit waves to generate a beat signal. The transceiver 11a is attached to the front side of the subject vehicle, such as a vehicle front grille, a bumper, a roof, a pillar or the like, at a position of a predetermined height.

A distance calculator 11b is configured to calculate a distance to the target based on the beat signal. That is, there are relations:

$$fr=(fb1+fb2)/2, \text{ and}$$

$$fd=(fb2-fb1)/2.$$

Here fb1 is a beat frequency in the upsweep interval, fb2 is a beat frequency in the downsweep interval, fr is a Doppler frequency at a relative speed of zero, and fd is a Doppler frequency at a non-zero relative speed (increased or decreased amount of frequency). Since the increase rate and the decrease rate are known, there is a fixed relationship between fr and the distance to the target. Therefore, the distance calculator 11b can calculate the distance to the target based on fb1 and fb2.

A Doppler frequency that is a variation in frequency between the transmit and receive waves is due to the Doppler effect. Therefore, there will be a fixed relationship between the relative speed and fd. A relative speed calculator 11c is configured to calculate the relative speed based on fb1 and fb2. The relative speed is defined by the speed of the subject vehicle minus the speed of the preceding vehicle. The relative speed takes a positive value when the distance decreases. The relative speed takes a negative value when the distance increases.

To acquire the beat frequencies fb1, fb2 from the beat signal, for example, Fourier transformation is applied to the beat signal in a digital signal processor (DSP) to analyze in which frequency band a prime component is present. Peaks occur at the power maxima in the spectrum of the beat signal. Thus, the beat frequencies are determined by peak frequencies of the beat signal (i.e., frequencies at which peaks appear that are equal to or greater than a predetermined threshold). Such peaks are indicative of the presence of a target.

A relative speed calculator 11c is configured to determine the beat frequency fb1 from a peak in the upsweep interval and the beat frequency fb2 from a peak in the downsweep interval. Thus, the distance to the target and the relative speed of the target can be detected. In the presence of a plurality of targets in the transmission range of the radar, a plurality of peaks may be detected in each of the upsweep and downsweep intervals.

A direction calculator 11d is configured to calculate a direction (or a lateral position) of a target relative to a frontal direction of the subject vehicle. The transceiver 11a has a plurality of receive antennas. When the target is present, other than in front of the subject vehicle, the beat signals received by the respective receive antennas are different in phase. Therefore, the direction of the target can be calculated using phase differences between the beat signals. Phases at the beat frequencies can be calculated through the Fourier transformation. In a monopulse method, the direction of the target can be calculated as follows. When the target is not present in the frontal direction of the subject vehicle, there is a path difference between the reflected waves received by two antennas. The path difference can be determined by a spacing between the two antennas and directions of the two antennas. Using the spacing between the receive antennas, wavelengths of the radio waves, and a fixed relationship between the phase difference and the path difference, the direction of the target corresponding to the path difference can be calculated from the phase difference between the beat signals received by the two receive antennas.

Alternatively, the direction of the target may be determined using digital beam forming (DBF) where a phased array antenna is realized by signal processing. For example, advancing or retarding the phase of one of beat signals received by two receive antennas that are different in phase allows the beat signals to match in phase where the signal intensity becomes maximal. Therefore, by changing the amount of phase shift of the beat signals received by the respective receive antennas and calculating a sum of signal intensities, the target can be estimated to be present in a direction corresponding to the amount of phase shift at which the total signal intensity becomes maximal. In the present embodiment, other methods for detecting the target direction including multiple signal classification (MUSIC) analysis, CAPON analysis and others may be used.

The radar device 11 is configured to transmit target information including the distance to the target and the relative speed and the direction of the target to the ACC ECU 12 every scan. In each scan, as described above, the frequency of the transmit wave is linearly increased in the upsweep interval and then linearly decreased in the downsweep interval subsequent to the upsweep interval. In the presence of a plurality of targets, the radar device 11 is configured to transmit target information about each of the targets to the ACC ECU 12 every scan. The radar device 11 is configured to update the target information every predetermined time period. The predetermined time period for one update cycle is set to, for example, 50 msec.

The ACC ECU 12 is configured to, based on the target information, a current vehicle speed, an acceleration and the like received from the radar device 11, transmit required drive forces or brake demand or the like to another ECU.

The adaptive cruise control (ACC) switch 15 is configured to, when operated by the driver of the subject vehicle to permit the full speed range adaptive cruise control, notify the ACC ECU 12 of it. For example, the adaptive cruise control (ACC) switch 15 is configured to notify to the ACC ECU 12 operational signals, such as signals for turning ON or OFF of the full speed range adaptive cruise control, switching between an adaptive cruise control mode and a constant speed control mode, settings of a vehicle speed for constant speed travel, settings of the inter-vehicle distance, and others. In the present embodiment, it is assumed that the subject vehicle travels in the adaptive cruise control mode. In the absence of a preceding vehicle, the subject vehicle remains in the adaptive cruise control mode and travels at a constant speed, which will be described later in more detail.

The engine ECU 13 is configured to control the throttle motor 17 while monitoring a throttle opening detected by the throttle sensor 18. For example, based on a table showing throttle openings corresponding to vehicle speeds and acceleration instruction values, the engine ECU 13 determines the throttle opening corresponding to the acceleration instruction value received from the ACC ECU 12 and the current vehicle speed. In addition, the engine ECU 13 determines the need for a gear change based on an up-shift line and a down-shift line predefined for the vehicle speed and the throttle opening, and if necessary, instruct the transmission 16 to change the gear. The transmission 16 may include a known mechanism, such as the automatic transmission (AT) or the continuously variable transmission (CVT).

The brake ECU 14 is configured to brake the subject vehicle by controlling opening and closing and a degree of opening of the valve of the brake ACT 20. The brake ACT 20 is configured to control the acceleration (deceleration) of the subject vehicle by increasing, maintaining, or decreasing the wheel cylinder pressure for each wheel. The brake ECU 14 is configured to brake the subject vehicle in response to the acceleration instruction value from the ACC ECU 12.

The acceleration instruction value determined by the ACC ECU 12 is transmitted to the engine ECU 13 and the brake ECU 14. As a result, the throttle motor 17 or the brake ACT 20 is controlled so that the subject vehicle can travel following the preceding vehicle while maintaining the target inter-vehicle distance. Under control of the engine ECU 13 and the brake ECU 14, the throttle opening may be increased, the throttle opening may be fully closed to decelerate the subject vehicle via engine braking, air resistance, or rolling resistance, or the throttle opening may be fully closed to decelerate the subject vehicle by the brake act 20 increasing the wheel cylinder pressure.

(Functions of ACC ECU)

Figure 2:
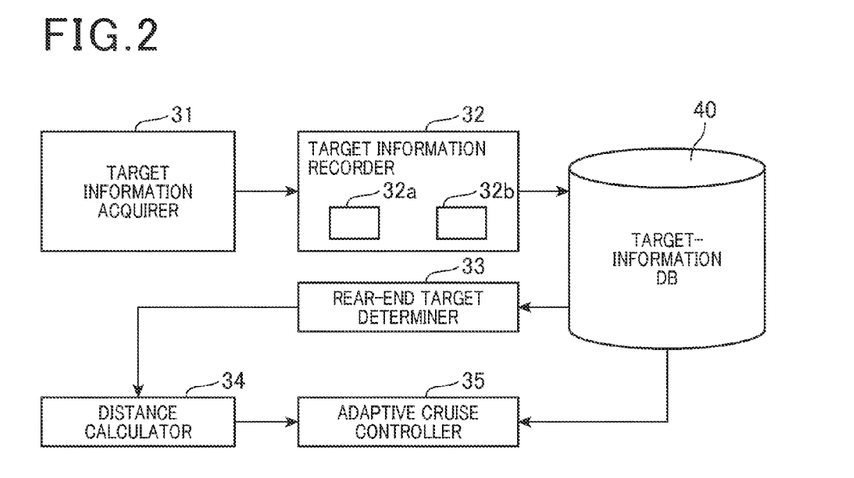
FIG. 2 is a functional block diagram of an ACC ECU.

FIG. 2 shows a functional block of the ACC ECU 12.

The ACC ECU 12 includes a target information acquirer 31, a target information recorder 32, a rear-end target determiner 33, a distance calculator 34, an adaptive cruise controller 35, and a target information database (DB) 40.

The target information acquirer 31 is configured to acquire target information about one or more targets from the radar device 11. The target information recorder 32 is configured to assign a unique identifier (ID) to each target and record target information associated with each target. The target information about each target includes a distance, a relative speed, and a lateral position of the target, and an offset (described later).

For each target, the lateral position of the target is a position of the target in the widthwise direction of the subject vehicle relative to the lateral center of the subject vehicle, and is calculated from the direction of the target and the distance to the target. The right direction from the lateral center of the subject vehicle may be defined as a positive direction, and the left direction from the lateral center of the subject vehicle may be defined as a negative direction. In the full speed range ACC, the subject vehicle follows the preceding vehicle that is closest to the subject vehicle and does not have to follow preceding vehicles traveling in lanes other than the traveling lane of the subject vehicle that is a lane in which the subject vehicle is traveling. Therefore, the target or targets, information of which has to be recorded, may belong to the preceding vehicle traveling in the same lane as the subject vehicle.

In the presence of two targets (first and second targets) forward of the subject vehicle, one forward of the other (the first target being the forward one, the second target being the rear one), the offset is a separation distance between the two targets and stored in association with the forward one.

The radar device 11 is configured to transmit the target information every cycle. The target information recorder 32 is configured to assign the same identifier to the same target and record the target information in the target information DB 40. For example, when a difference between a lateral position of a first target received from the radar device 11 and a lateral position of a second target recorded in the target information DB 40 is equal to or less than a possible maximum lateral-position variation for one cycle, the first and second targets may be determined as the same target. Alternatively, when a difference between a distance to a first target received from the radar device 11 and a distance to a second target recorded in the target information DB 40 is equal to or less than a possible maximum distance variation for one cycle, the first and second targets may be determined as the same target. Then, the target information recorder 32 updates the target information associated with the same identifier recorded in the target information DB 40. The target information recorder 32, together with the target information DB 40, serves as an offset storage configured to, in the presence of first and second targets forward of the subject vehicle, the first target being forward of the second target, the second target being a target recognized as a rear end of the preceding vehicle, calculate and store an offset associated with the first target, the offset being a difference between the detected distance to the first target and the detected distance to the second target.

The rear-end target determiner 33 is configured to, based on the target information, determine a target that is closest to the subject vehicle as a rear-end target. The distance calculator 34 is configured to calculate a distance from the subject vehicle to the rear-end target (at the rear end of the preceding vehicle) by subtracting the offset associated with a forward target (a target forward of the rear-end target) from a detected distance to the forward target. In the presence of a plurality of forward targets present forward of the rear end of the preceding vehicle, the distance calculator 34 is configured to calculate, for each of the forward targets, a distance to the rear end of the preceding vehicle by subtracting the offset associated with the forward target from the detected distance to the forward target, and then select, as a corrected distance to the rear-end target, a shortest one of the calculated distances for the respective forward targets. The adaptive cruise controller 35 is configured to implement the adaptive cruise control based on the corrected distance to the rear-end target calculated by the distance calculator 34.

The target information recorder 32 includes an offset updater 32*a* and an offset eraser 32*b*. The offset updater 32*a* is configured to determine whether or not a relative distance between forward and rear targets has increased or decreased in the traveling direction of the subject vehicle and when it is determined that the relative distance between the forward and rear targets has varied by a predetermined distance or more, update the offset.

Figure 3A:
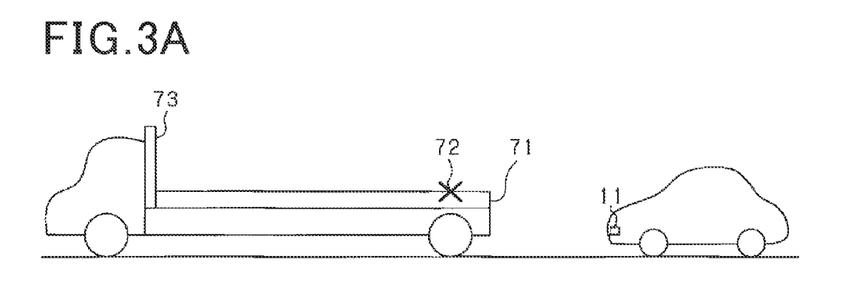
FIGS. 3A and 3B are examples of target displacement.

That is, in the presence of two targets (as first and second targets) on the preceding vehicle, one forward of the other (the first target being a forward target, and the second target being a rear target), the two targets may not remain unchanged in fore-and-aft position, but either or both of the two targets may be forward or rearward displaced unexpectedly due to various factors, such as dimensions, shapes or the like of the reflecting portions. For example, in the case of a vehicle having a small area rear end and a relatively large area backside portion forward of the rear end, such as a car carrier trailer, as shown in FIG. 3A, both the backside portion 73 and a portion of the vehicle rearward of the backside portion 73 may be recognized as individual targets. However, the rear end 71 of the preceding vehicle may not be necessarily recognized as a target that is closest to the subject vehicle (i.e., the rear-end target). In such a case, either the rear end 71 or a middle portion 72 forward of the rear end 71 may be recognized as the rear-end target. In addition, a situation in which the rear-end target is recognized may change arbitrarily during travel of the vehicle. An offset value may change as the situation changes, which may affect the adaptive cruise control.

Figure 3B:
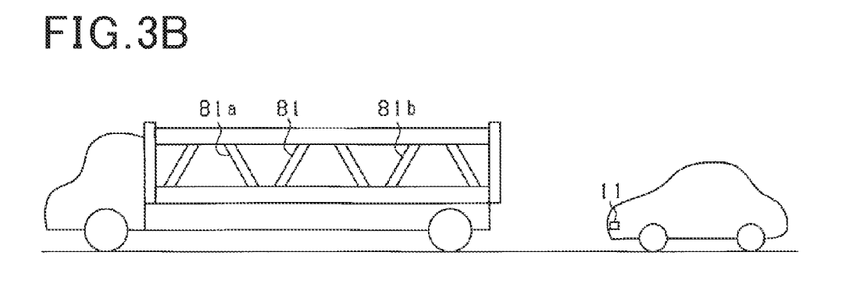

In the case of a car carrier trailer having a plurality of support pillars as shown in FIG. 3B, the target 81 that has been recognized as the forward target may be displaced to a position 81*a* forward of the target 81 or to a position 81*b* rearward of the target 81 in the traveling direction of the subject vehicle. In such a case, the adaptive cruise control may be affected unless the offset update in conjunction with such target displacement is taken into account.

Therefore, in the present embodiment, it is determined whether or not the relative distance between the forward and rear targets (as first and second targets) has increased or decreased, and if it is determined that the relative distance between the forward and rear targets has increased or decreased, then the offset may be updated. With this configuration, even if one or more targets on the same object (e.g., the preceding vehicle) have been displaced unexpectedly, the proper adaptive cruise control can be continually implemented while handling such target displacement.

In addition, it can be envisaged that a new target belonging to the same object as the forward and rear targets (first and second targets) appears at a later time. Therefore, in the present embodiment, when such a new target is detected, an offset is stored associated with the new target. The offset associated with the new target is calculated from a shortest one of the detected distances to the previously recognized targets and the detected distances to the previously recognized targets subtracted by the offsets respectively associated with the previously recognized targets, if any. This allows the adaptive cruise control to follow the rear-end target to be implemented using the new target.

The offset eraser 32*b* is configured to determine whether or not two targets, one forward of the other, considered to belong to the same object (that is the preceding vehicle) actually belong to different objects. The offset eraser 32*b* is configured to, when it is determined that the two targets belong to different objects, erase (or invalidate) the offset calculated from the detected distances of the two targets.

To detect a large vehicle, such as a car carrier trailer or the like, as a preceding vehicle, a detection zone forward of the subject vehicle may be set relatively large. Therefore, when a plurality of vehicles are spaced apart from each other by short distances while traveling substantially at the same low speed during a traffic jam, the plurality of vehicles may be recognized incorrectly as the same object (i.e., the preceding vehicle). This leads to incorrect settings of offsets between the different vehicles identified as the same vehicle. As a result, there is concern that the adaptive cruise control to follow the preceding vehicle may fail to be implemented properly.

Figure 4A:
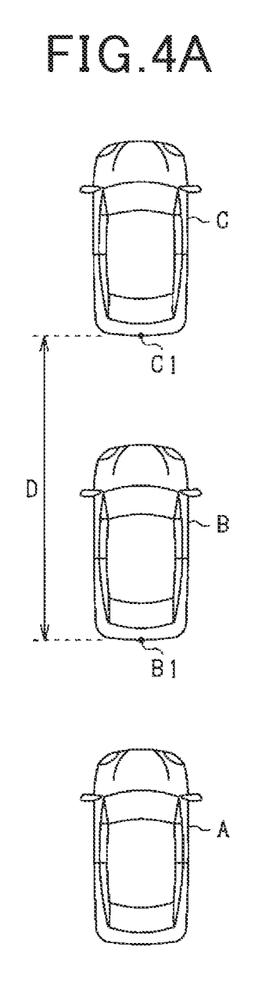
FIGS. 4A and 4B show a scenario in which an offset is set for a plurality of vehicles.

In the presence of two vehicles B and C, the vehicle C forward of the vehicle B, that are traveling forward of the subject vehicle A as shown in FIG. 4A, the vehicles B and C may be incorrectly recognized as the same object (preceding vehicle). For example, in the case that the vehicle C traveling forward of the vehicle B that is greater in vehicle height than the vehicle B is traveling substantially at the same speed, targets on the vehicles B and C (the target C1 being on the vehicle C, the target B1 being on the vehicle B) may be recognized at the same time, which may cause the vehicles B and C to be recognized incorrectly as the same vehicle. In such a case, an offset D of the target C1 relative to the target B1, which is a difference between the detected distance from the subject vehicle A to the target C1 on the vehicle C and the detected distance from the subject vehicle A to the target B1 on the vehicle B, may be set associated with the target C1 on the vehicle C.

Figure 4B:
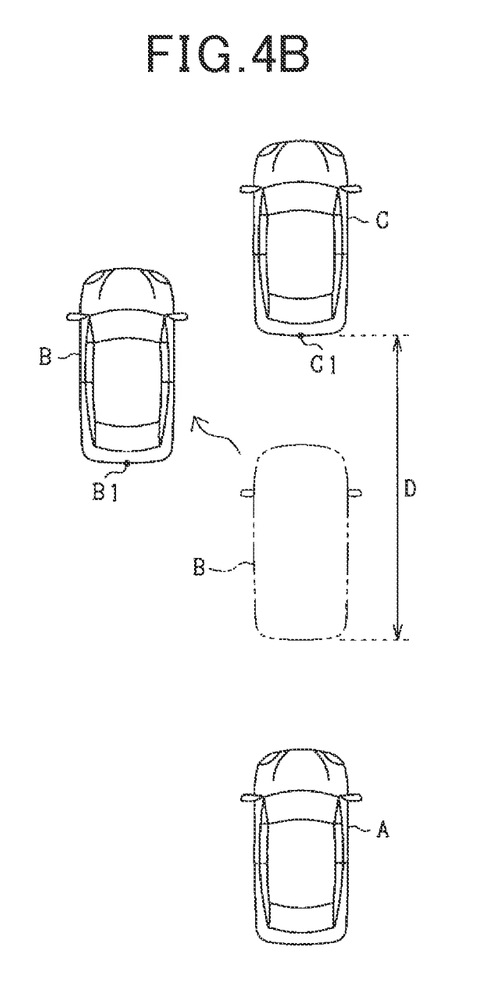

FIG. 4B shows a case that the vehicle B has left the same lane as the subject vehicle A via a lane change or the like. In such a case, the inter-vehicle distance between the vehicle C and the subject vehicle A may be unable to be controlled properly to a target inter-vehicle distance due to the presence of the offset D set associated with the vehicle C.

Therefore, the offset eraser 32b is configured to, based on the presence or absence of the relative displacement between the forward and rear targets, determine whether or not these targets belong to different vehicles, and based on the determination result, erase the offset.

Figure 5:
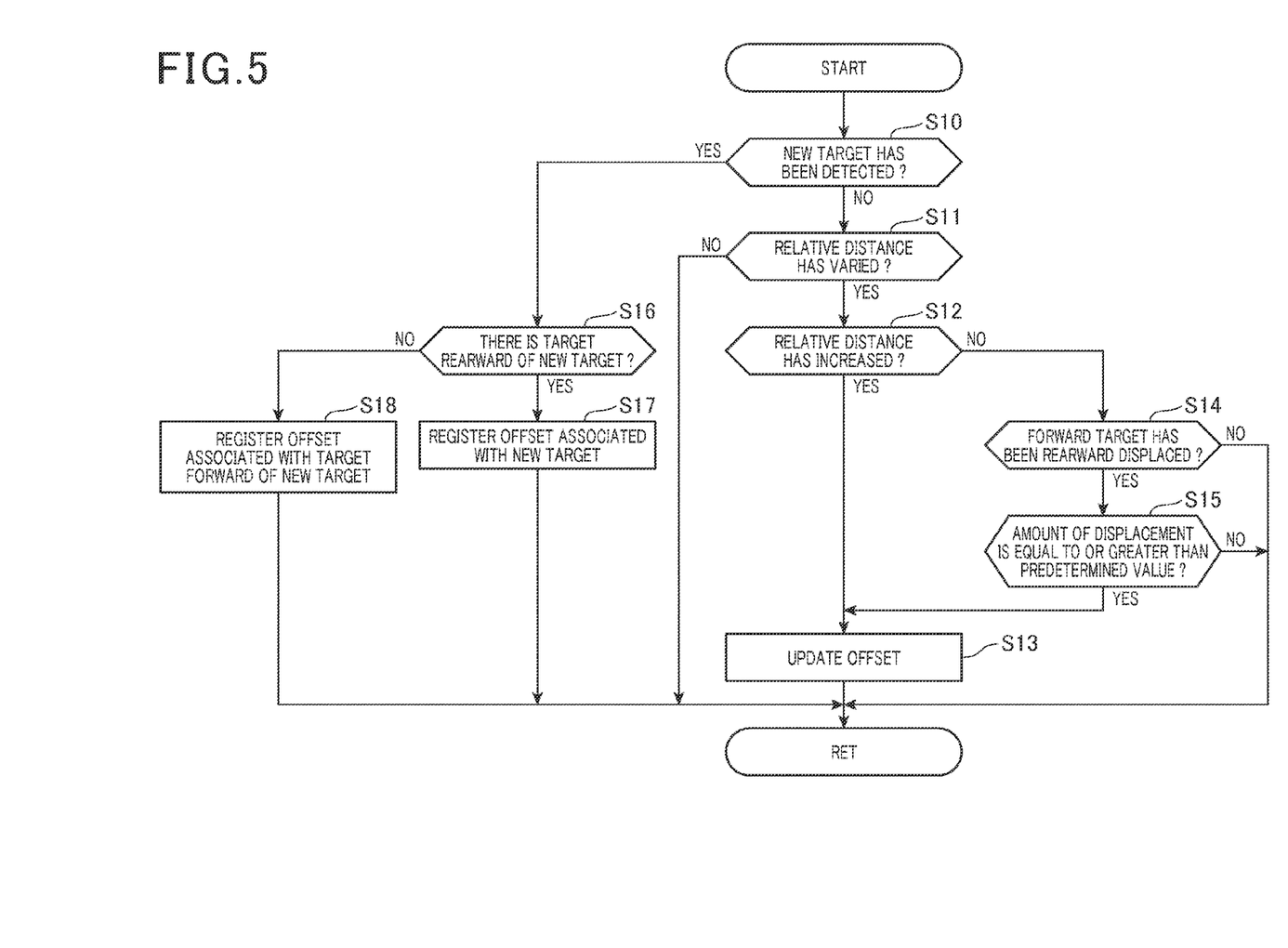
FIG. 5 is a flowchart of an offset update process.

An offset updating process will now be explained. This process may be performed in the offset updater 32a of the ACC ECU 12 every cycle. For example, the offset updating process may be performed at the same frequency as the acquisition of the target information from the radar device 11. An offset erase process described later may also may be performed at the same frequency as the acquisition of the target information from the radar device 11.

Referring to FIG. 5, in step S10, it is determined based on the target information acquired from the radar device 11 whether or not a new target has been detected. If in step S10 it is determined that no new target has been detected, then in step S11 it is determined whether or not a relative distance between two targets, one forward of the other, if any, has varied. It may here be assumed that the rear target is a rear-end target that is recognized as the rear end of the preceding vehicle.

If in step S11 it is determined that the relative distance between the two targets has varied, then in step S12 it is determined whether or not the relative distance between the two targets has increased. In step S13, an offset associated with the forward target is updated to be increased by an amount of increase in relative distance between the two targets.

If in step S12 it is determined that the relative distance between the two targets has decreased, then in step S14 it is determined whether or not the forward target has been rearward displaced, that is, whether or not the forward target has been displaced toward the subject vehicle. That is, it is determined whether or not the decrease in relative distance between the two targets is due to the rearward displacement of the forward target. If in step S14 it is determined that the forward target has been rearward displaced, then in step S15 it is determined whether or not an amount of displacement is equal to or greater than a predetermined value (e.g., 1 m). If in step S15 that the amount of displacement is equal to or greater than the predetermined value, then in step S13 the offset is updated to be decreased by the amount of displacement of the forward target.

In the case that the relative distance between the two targets has decreased and the decrease in relative distance between the two targets is due to the rearward displacement of the forward target, a rear-target position itself may remain unchanged. Therefore, unless the offset associated with the forward target is updated to be decreased, a recognized position of the rear end of the preceding vehicle may become too close to the subject vehicle, which may lead to an actual inter-vehicle distance from the preceding vehicle to the subject vehicle greater than the target inter-vehicle distance under the adaptive cruise control. In such a situation that the actual inter-vehicle distance from the preceding vehicle to the subject vehicle becomes greater than the target inter-vehicle distance under the adaptive cruise control, there is concern that the subject vehicle may be braked earlier than intended by the driver of the subject vehicle (for example, unexpected rapid braking may occur). With this configuration of the present embodiment, the offset is updated in the case that the relative distance between the two targets has decreased and the decrease in relative distance between the two targets is due to the rearward displacement of the forward target (as the first target). This may prevent such a disadvantage that unintended braking of the subject vehicle may occur.

In the case that the relative distance between the two targets has increased and the increase in the relative distance between the two targets is due to rearward displacement of the rear target (as the second target) and the offset associated with the rear target is stored, it can be considered that a reflecting point at or closer to the rear end of the preceding vehicle has been detected. Also in such a case, unless the offset associated with the rear target is updated to be decreased, a recognized position of the rear end of the preceding vehicle may become too close to the subject vehicle, which may lead to an actual inter-vehicle distance from the preceding vehicle to the subject vehicle greater than the target inter-vehicle distance under the adaptive cruise control. With this configuration of the present embodiment, the offset is updated in the case that the increase in the relative distance between the two targets is due to the rearward displacement of the rear target (as the second target). The offset associated with the rear target is updated based on the previous value of the detected distance to the rear target subtracted by a stored value of the offset associated with the rear target. This can prevent variations of the relative distance between the two targets, and can thus prevent unnecessary updating of the offset associated with the forward target (as the first target). This may prevent such a disadvantage that unintended braking of the subject vehicle may occur.

For each target, a determination of whether or not the target has been rearward displaced can be made by determining whether or not an amount of variation in detected relative distance between the target and the subject vehicle is equal to or greater than an amount of variation in estimated distance from the subject vehicle to the target calculated based on the relative speed between the target and the subject vehicle by a predetermined value.

If in step S10 it is determined that a new target has been detected, then in step S16 it is determined whether or not there is a target rearward of the new target. If in step S16 it is determined that there is a target rearward of the new target, then in step S17 an offset that is a distance between the new target and the target rearward of the new target is stored or registered associated with the new target. If an offset is stored associated with the target rearward of the new target, then this offset is also stored associated with the new target.

If in step S16 it is determined that there is no target rearward of the new target, then in step S18, for each of the targets forward of the new target, an offset that is a distance between the target forward of the new target and the new target is stored associated with the target forward of the new target. That is, if a new target that is closer to the subject vehicle than the current rear-end target is detected, the new target, instead of the current target, is set as a new rear-end target. In addition, for each of the targets forward of the new target, an offset is stored or registered associated with the target forward of the new target, which is a distance between the target forward of the new target and the new target. This allows the adaptive cruise control to follow the rear-end of the preceding vehicle to be properly implemented.

If in step S11 it is not determined that the relative distance between the two targets has varied, if in step S14 it is not determined that the forward target has been rearward displaced, or if in step S15 it is not determined that the amount of displacement is equal to or greater than the predetermined value, then the process ends.

Figure 6:
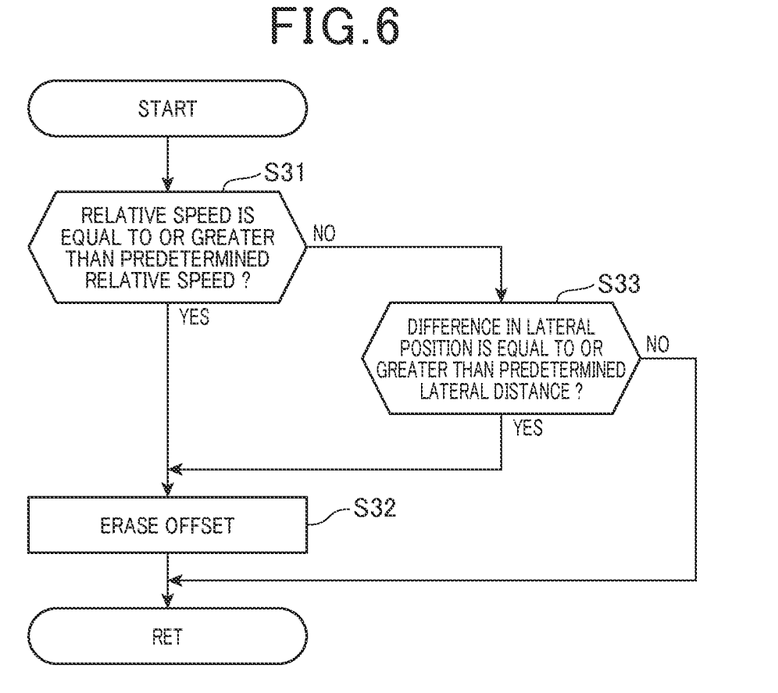
FIG. 6 is a flowchart of an offset erase process.

The offset erase process will now be explained. The offset erase process may be performed in the offset eraser 32b of the target information recorder 32.

Referring to FIG. 6, in step S31, it is determined whether or not a relative speed between a pair of targets, one forward of the other, both considered to belong to the same object (preceding vehicle) is equal to or greater than a predetermined relative speed. If in step S31 it is determined that the relative speed between the pair of targets is equal to or greater than the predetermined relative speed, then in step S32 the offset stored associated with the forward target is erased because it is determined that the pair of targets do not belong to the same object. The relative speed between the pair of targets may be calculated a difference between the relative speed between the subject vehicle and one of the targets and the relative speed between the subject vehicle and the other of the targets.

If in step S31 it is determined that the relative speed between the pair of targets is less the predetermined relative speed, then in step S33 it is determined whether or not a difference in lateral position between the pair of targets is equal to or greater than a predetermined lateral distance. For example, it is determined whether or not a difference in lateral position between the pair of targets is equal to or greater than a vehicle width (for example, of the preceding vehicle). If in step S33 it is determined that the difference in lateral position between the pair of targets is equal to or greater than the predetermined lateral distance, then in step S32 the offset stored associated with the forward one is erased. If in step S33 it is determined that the difference in lateral position between the pair of targets is less than the predetermined lateral distance, that is, if it is determined that the relative speed between the pair of targets is less than the predetermined relative speed and the difference in lateral position between the pair of targets is less than the predetermined lateral distance, then the process ends. In such a case, the offset stored associated with the forward target is maintained.

The present embodiment of this disclosure can provide the following advantages.

(i) In the presence of two targets (first and second targets) on the preceding vehicle, one forward of the other (the first target forward of the second target), the two targets may not remain unchanged in fore-and-aft position, but either or both of the two targets may be forward or rearward displaced unexpectedly due to various factors. Thus, there is concern that the adaptive cruise control cannot be implemented correctly without taking into account such displacement. Therefore, it is determined whether or not the relative distance between the first and second targets has increased or decreased, and if it is determined that the first and second targets has increased or decreased, the offset associated with the first or second target is updated. With this configuration, even when the first or second target on the preceding vehicle has been displaced unexpectedly, the proper adaptive cruise control can be continually implemented while handling such target displacement.

(ii) Given two targets at the same position on the preceding vehicle where an offset stored associated with one of the two targets is greater than an offset stored associated with the other, a recognized position of the rear end of the preceding vehicle calculated using the offset associated with the one of the two targets is closer to the subject vehicle than a position of the rear end of the preceding vehicle calculated from the offset associated with the other. Therefore, from the point of view of crash safety to the preceding vehicle, it is preferable that the position of the rear end of the preceding vehicle is calculated using the larger offset. In the configuration of the present embodiment, if the relative distance between two targets, one forward of the other, has increased, the offset should be updated, and if the relative distance between two targets, one forward of the other, has decreased, the offset should not be updated. This allows the proper adaptive cruise control to be implemented.

(iii) In the case that the relative distance between two targets, one forward of the other, has decreased, and the decrease in relative distance between the two targets is due to the rearward displacement of the forward target (as the first target), the offset is updated. This can prevent a disadvantage that a recognized position of the rear end of the preceding vehicle may become too close to the subject vehicle and as a result the subject vehicle may be braked earlier than intended by the driver of the subject vehicle (for example, unexpected rapid braking may occur), which allows the proper adaptive cruise control to be implemented.

(iv) In the case that the relative distance between two targets, one forward of the other, has increased, and the increase in the relative distance between the two targets is due to the rearward displacement of the rear target (as the second target) and the offset associated with the rear target is stored, the offset associated with the rear target is updated. This can prevent a disadvantage that a recognized position of the rear end of the preceding vehicle may become too close to the subject vehicle and as a result the subject vehicle may be braked earlier than intended by the driver of the subject vehicle (for example, unexpected rapid braking may occur), which allows the proper adaptive cruise control to be implemented.

(v) There is concern that in the case that a position of a forward one of two targets (first and second targets), one forward of the other (the first target forward of the second target), changes, the adaptive cruise control may be incorrectly implemented. To avoid such a case, the position of the forward target can be detected by acquiring the relative speed between the forward target and the subject vehicle. Based on the detection result, the proper adaptive cruise control to be implemented.

(vi) In the case that a new target having no offset stored associated therewith is detected in the presence of two targets (first and second targets), one forward of the other (the first target forward of the second target), an offset is stored associated with the new target. The offset associated with the new target is a difference between a detected distance to the new target and a shortest one of the detected distances to the previously recognized targets (the first and second targets) and the detected distances to the previously recognized targets subtracted by the offsets respectively associated with the previously recognized targets. This allows the adaptive cruise control to be implemented using the new target.

(Modifications)

Some modifications to the above embodiment that may be devised without departing from the spirit and scope of the present invention.

(a) In the offset erase process described above, a condition for the vehicle speed of the subject vehicle may be added since during a traffic jam or the like two or more vehicles traveling at the same low speed are likely to be misidentified as the same vehicle. More specifically, in step S31 of the offset erase process, it may be additionally determined whether or not the speed of the subject vehicle is less than a predetermined speed.

(b) In the embodiment described above, the radar device 11 is used as a distance detection sensor. Alternatively or additionally, a camera or a stereoscopic camera may be used. Also with use of the camera or the stereoscopic camera, similar information about the target may be acquired. The radar and the stereoscopic camera are different in the detection range and accuracy. Therefore, advantageously, the subject vehicle may be equipped with both the radar and the stereoscopic camera, where the radar and the stereoscopic camera can be complementarily used to implement sensor fusion based distance detection. That is, in the sensor fusion based distance detection, the stereoscopic camera may be used to acquire short-range distance information and a lateral position of a near target that is difficult for the radar device 11 to detect, and the radar device 11 may be used to acquire mid- to long-range distance information and a lateral position of a remote target that is difficult for the stereoscopic camera to detect.

Whereas particular embodiments of the present invention have been described above as examples, it will be appreciated that variations of the details may be made without departing from the scope of the invention. One skilled in the art will appreciate that the present invention can be practiced by other than the disclosed embodiments, all of which are presented in this description for purposes of illustration and not of limitation. It is noted that equivalents of the particular embodiments discussed in this description may result in the practice of this invention as well. Therefore, reference should be made to the appended claims rather than the foregoing discussion or examples when assessing the scope of the invention in which exclusive rights are claimed.

What is claimed is:

1. A vehicle control apparatus for implementing inter-vehicle distance control of a vehicle carrying the apparatus based on reflected waves from a plurality of targets on a preceding vehicle that is directly in front of the vehicle carrying the apparatus, each of the targets being a reflecting portion of the preceding vehicle, the vehicle carrying the apparatus being referred to as a subject vehicle, the reflected waves being radar waves transmitted to a front of the subject vehicle and then reflected from the targets, the apparatus comprising:
   a processor;
   a target information acquirer, using the processor, configured to acquire target information about each of the plurality of targets from the reflected waves, the target information about the plurality of targets including a detected distance from the subject vehicle to the target of the preceding vehicle;
   an offset storage configured to, for first and second targets of the plurality of targets, the first target being anterior of the second target in a longitudinal direction of the preceding vehicle, the second target being recognized as a rear end of the preceding vehicle, calculate and store an offset associated with the first target, the offset being a difference between the detected distance from the subject vehicle to the first target and the detected distance from the subject vehicle to the second target;
   a controller, using the processor, configured to implement inter-vehicle distance control based on a distance calculated by subtracting the offset associated with the first target stored by the offset storage from the detected distance from the subject vehicle to the first target; and
   an offset updater, using the processor, configured to determine whether a relative distance between the first and second targets has varied, and when it is determined that the relative distance between the first and second targets has varied, update the offset stored by the offset storage using the detected distance from the subject vehicle to the first target and the detected distance from the subject vehicle to the second target acquired after the relative distance between the first and second targets has varied.

2. The apparatus of claim 1, wherein the offset updater is configured to, when the relative distance between the first and second targets has increased, update the offset, and when it is determined that the relative distance between the first and second targets has decreased, leave the offset unchanged.

3. The apparatus of claim 1, wherein the offset updater is configured to, when the relative distance between the first and second targets has decreased and the decrease in relative distance between the first and second targets is due to rearward displacement of the first target, update the offset associated with the first target.

4. The apparatus of claim 1, wherein the target information further includes a relative speed between the first target and the subject vehicle,
   wherein the offset updater is configured to, based on the relative speed of the first target, determine whether or not the relative distance between the first and second targets has varied.

5. The apparatus of claim 1, wherein the offset updater is configured to, when the relative distance between the first and second targets has increased and the increase in relative distance between the first and second targets is due to rearward displacement of the second target by a predetermined distance or more, update an offset associated with the second target and previously stored by the offset storage.

6. The apparatus of claim 1, wherein the target information further includes a relative speed between the second target and the subject vehicle,
   wherein the offset updater is configured to, based on the relative speed of the second target, determine whether or not the relative distance between the first and second targets has varied.

7. The apparatus of claim 1, wherein the offset storage is configured to, when a new target other than the first and second targets appears, the new target being forward of either or both of the first and second targets, store an offset associated with the new target that is a difference between the detected distance to the new target and the detected distance to the second target or a difference between the detected distance to the new target and the detected distance to the second target subtracted by the offset stored associated with the second target.

8. The apparatus of claim 1, wherein the offset storage is configured to, when a new target other than the first and second targets appears, the new target being rearward of the first and second targets, store or register an offset associated with each of the first and second targets that is a difference between the detected distance to the new target and the detected distance to the each of the first and second targets.

9. A computer implemented method for implementing inter-vehicle distance control of a vehicle carrying a vehicle control apparatus based on reflected waves from a plurality of targets on a preceding vehicle that is directly in front of the vehicle carrying the apparatus, each of the targets being a reflecting portion of the preceding vehicle, the vehicle carrying the apparatus being referred to as a subject vehicle, the reflected waves being radar waves transmitted to a front of the subject vehicle and then reflected from the targets, the method comprising:
- acquiring target information about each of the targets from the reflected waves, the target information about each of the targets including a detected distance from the subject vehicle to the target of the preceding vehicle;
- calculating and storing an offset associated with a first target in offset storage, the offset being a difference between the detected distance from the subject vehicle to the first target and the detected distance from the subject vehicle to a second target, wherein the first and second targets belong to the plurality of targets, the first target being anterior of the second target in a longitudinal direction of the preceding vehicle, the second target being a target recognized as a rear end of the preceding vehicle;
- implementing an inter-vehicle distance control based on a distance calculated by subtracting the offset associated with the first target stored by the offset storage from the detected distance from the subject vehicle to the first target; and
- determining whether or not a relative distance between the first and second targets has varied, and when it is determined that the relative distance between the first and second targets has varied, updating the offset stored by the offset storage using the detected distance from the subject vehicle to the first target and the detected distance from the subject vehicle to the second target acquired after the relative distance between the first and second targets has varied.

10. The method of claim 9, wherein the updating further comprises, when the relative distance between the first and second targets has increased, updating the offset, and when it is determined that the relative distance between the first and second targets has decreased, leaving the offset unchanged.

11. The method of claim 9, wherein the updating further comprises, when the relative distance between the first and second targets has decreased and the decrease in relative distance between the first and second targets is due to rearward displacement of the first target, updating the offset associated with the first target.

12. The method of claim 9, wherein the target information further includes a relative speed between the first target and the subject vehicle,
wherein the updating further comprises, based on the relative speed of the first target, determining whether or not the relative distance between the first and second targets has varied.

13. The method of claim 9, wherein the updating further comprises, when the relative distance between the first and second targets has increased and the increase in relative distance between the first and second targets is due to rearward displacement of the second target by a predetermined distance or more, updating an offset associated with the second target and previously stored by the offset storage.

14. The method of claim 9, wherein the target information further includes a relative speed between the second target and the subject vehicle,
wherein the updating further comprises, based on the relative speed of the second target, determining whether or not the relative distance between the first and second targets has varied.

15. The method of claim 9, wherein the storing further comprises, when a new target other than the first and second targets appears, the new target being forward of either or both of the first and second targets, storing an offset associated with the new target that is a difference between the detected distance to the new target and the detected distance to the second target or a difference between the detected distance to the new target and the detected distance to the second target subtracted by the offset stored associated with the second target.

16. The method of claim 9, wherein the storing further comprises, when a new target other than the first and second targets appears, the new target being rearward of the first and second targets, storing or registering an offset associated with each of the first and second targets that is a difference between the detected distance to the new target and the detected distance to the each of the first and second targets.

17. A system for implementing inter-vehicle distance control of a vehicle carrying a vehicle control apparatus based on reflected waves from a plurality of targets on a preceding vehicle that is directly in front of the vehicle carrying the apparatus, each of the targets being a reflecting portion of the preceding vehicle, the vehicle carrying the apparatus being referred to as a subject vehicle, the reflected waves being radar waves transmitted to a front of the subject vehicle and then reflected from the targets, the system comprising:
- a processor;
- a processor-readable storage medium; and
- a set of processor-executable instructions stored on the processor-readable storage medium that cause the processor to execute:
  - acquiring target information about each of the targets from the reflected waves, the target information about each of the targets including a detected distance from the subject vehicle to the target of the preceding vehicle;
  - calculating and storing an offset associated with a first target in offset storage, the offset being a difference between the detected distance from the subject vehicle to the first target and the detected distance from the subject vehicle to a second target, wherein the first and second targets belonging to the plurality of targets, the first target being anterior of the second target in a longitudinal direction of the preceding vehicle, the second target being a target recognized as a rear end of the preceding vehicle;
  - implementing an inter-vehicle distance control based on a distance calculated by subtracting the offset associated with the first target stored by the offset storage from the detected distance from the subject vehicle to the first target; and
  - determining whether or not a relative distance between the first and second targets has varied, and when it is determined that the relative distance between the first and second targets has varied, updating the offset stored by the offset storage using the detected distance from the subject vehicle to the first target and the detected distance from the subject vehicle to the second target acquired after the relative distance between the first and second targets has varied.

* * * * *